United States Patent [19]

Kobayashi

[11] Patent Number: 4,992,858
[45] Date of Patent: Feb. 12, 1991

[54] LASER BEAM SCANNING APPARATUS
[75] Inventor: Koji Kobayashi, Hino, Japan
[73] Assignee: Kowa Company Ltd., Japan
[21] Appl. No.: 251,507
[22] Filed: Sep. 29, 1988
[30] Foreign Application Priority Data
Sep. 30, 1987 [JP] Japan ................................ 62-243587
[51] Int. Cl.⁵ .............................................. H04N 9/10
[52] U.S. Cl. ......................................... 358/53; 358/63
[58] Field of Search ....................... 358/53, 60, 63, 75, 358/201, 235
[56] References Cited

U.S. PATENT DOCUMENTS

4,736,110  4/1988  Awamura ............................. 250/578
4,833,528  5/1989  Kobayashi ............................ 358/53
4,835,601  5/1989  Kobayashi ............................ 358/53

*Primary Examiner*—James J. Groody
*Assistant Examiner*—Kim Yen Vu
*Attorney, Agent, or Firm*—Bruce L. Adams; Van C. Wilks

[57] ABSTRACT

A laser beam scanning apparatus deflects laser beams of different wavelengths to scan an object or medium in at least one direction using an acousto-optic deflector. The angle of scanning deflection is dependent on the frequency of the drive signal applied to the acousto-optic deflector and the wavelength of each laser beam, the deflection resulting in color dispersion of the laser beam. A pair of photosensors which are sensitive to the corresponding wavelengths of the laser beams produce start and stop signals during a scanning time period. In response to these signals, writing or reading clock signals are generated and their durations are adjusted to be substantially the same for each laser beam during the scanning time period.

24 Claims, 6 Drawing Sheets

LASER BEAM SCANNING APPARATUS

BACKGROUND OF THE INVENTION

1. Field of the Invention

This invention relates to a laser beam scanning apparatus, and more particularly to a laser beam scanning apparatus for scanning an object by using a plurality of laser beams each having a different wavelength from the others, photodetection and photoelectrical conversion of the reflected or transmitted laser beams being then employed to produce image data of the object, and to a laser beam scanning apparatus for scanning an object by using a plurality of laser beams, each having a different wavelength, intensity-modulating the laser beams by a corresponding video signal and scanning the medium to produce a color image thereon.

2. Description of the Prior Art

The flying spot scanning-type video input system by means of which an object is scanned by a laser beam spot and the light reflected or transmitted therefrom is picked up by a photosensor to obtain video signals and image output systems whereby a spot of laser light that is intensity-modulated by video signals is used to scan a medium, such as a screen or film to display or record an image thereon feature a number of advantages, such as the brightness, convergence and coherence of the laser beam. These systems are widely used in industrial and medical fields. Using the laser beam to scan two-dimensionally, horizontally and vertically, and having the scanning rate correspond to the raster scan of an ordinary TV system enables a real-time video image to be obtained which is free of residual images and, as such, has a broader range of use and markedly improved operability. See for example U.S. Pat. No. 4,213,678 and Japanese Laid-open Patent Application No. 62(1987)-117524.

In such a system, means for deflecting the laser beam to scan horizontally or vertically include mechanically driven methods that employ a swinging mirror or a polygonal mirror or other such rotating, multi-faceted mirrors, and non-mechanical methods such as acousto-optical deflectors and the like. With an acousto-optical method, tracking is simplified since it can be carried out at the horizontal scanning frequency of 15.75 KHz in the NTSC system. Also, the deflector is small, and stable contains few parts that wear out due to mechanical of operation. Such a system is highly reliable and long-lasting.

However, because acousto-optical deflectors employ diffraction, they give rise to color dispersion from first-order diffraction when using a plurality of laser beams each having a different wavelength.

FIG. 3 shows the operation of an acousto-optical deflector 60 that is driven by a signal source 61. If the ultrasonic driving frequency is f, the wavelength of the incident laser beam is $\lambda$ and the ultrasonic velocity is v, the angle of diffraction $\theta$ of the first-order diffraction obtained by the operation of the acousto-optical deflector is:

$$\theta \approx \lambda f/v$$

However, with such a deflection system, unlike a mechanically driven mirror-type method, because the angle of diffraction is dependent on the wavelength of the incident beam, color dispersion occurs. For example, when the three-color R (red), G (green), and B (blue) laser beam shown in FIG. 4 impinges on the acousto-optical deflector 60, the longer wavelengths produce larger angles of diffraction, so first-order diffraction color dispersion is produced. Therefore, when a laser source which produces a plurality of laser beams is used to obtain chromatic information about an object, the drawback is that the coloring of the images has been difficult.

The present applicants previously developed a technique for compensating for the effects of color dispersion caused by the deflector. This technique consisted of the provision of electronic processing means to process the signal using a different time-base for each wavelength corresponding to the color dispersion produced by the deflection means (c.f. Japanese Patent Applications Nos. 61(1986)-80236 and 61(1986)-80237 corresponding to U.S. patent applications Ser. Nos. 35,091 and 35,090 filed on Apr. 6, 1987).

The above technique is illustrated by FIG. 5. The effect of deflector-induced color dispersion is removed electronically by varying the timing during each scanning period of the storage in, and retrieval from memory of predetermined signals corresponding to the R, G and B wavelengths. (For further details please refer to the specifications of the above applications.) This technique offered a low-cost way of removing chromatic shifts arising from color dispersion that is an inherent drawback of the acousto-optical deflector. It also enables the realization of high scanning frequencies. Also, the deflector can be made compact and stable, for a long, durable working life and high reliability.

However, when using wavelengths of the three primary colors, R, G and B, this electronic signal processing means has to determine six constants in all, consisting of the clock frequency and the start-timing of the memory write-in or read-out for each wavelength. The adjustment is thus time-consuming. Moreover, the temperature of the circuitry has to be controlled, especially that of the oscillators, to prevent external temperature fluctuations from producing variations in clock frequencies. Otherwise, even after adjustment to exclude the effects of color dispersion, in some cases chromatic shift was produced. Namely, in the said applications the signals used to control the timing of the memory write-in or read-out operations are produced as synchronized signals, mainly based on horizontal synchronization signals, so it has been time-consuming to perfectly adjust the delay time from the synchronization signals, the frequency of the oscillator and the like. Even after these adjustments there was still a possibility that, unless strict control of the temperature was exercised, fluctuations might still arise after the adjustment process.

SUMMARY OF THE INVENTION

It is therefore an object of the present invention to provide an improved laser beam scanning apparatus that is easy to adjust and is capable of stable signal processing operations without rigorous temperature control.

A laser beam scanning apparatus, according to the present invention, is adapted for use in deflecting a laser beam to scan an object or medium in at least one direction, and comprises a laser source for producing a plurality of laser beams each having a different wavelength; a signal source for producing a drive signal having a frequency which can be changed during one scanning time period of the laser beam; an acousto-optical deflector responsive to the drive signal for deflecting the laser beams simultaneously at an angle of scanning deflection which is dependent on the drive signal frequency and the wavelength of each laser beam, resulting in color dispersion from the deflector; detecting means disposed at a plane corresponding to a focal plane on which the laser beams are focused; a pair of photosensors sensitive to the corresponding wavelength of the laser beams transmitted through or reflected on the detecting means and responsive thereto to produce start and end signals during one scanning time period, respectively; means for generating clock signals each of which corresponds to the wavelength of the laser beams and which begins and ends in response to the start and end signals; and means for adjusting the number of the clock signals to be substantially the same for each laser beam during the scanning time period.

These clock signals are preferably used as those for writing or reading signals which are derived from the object scanned by the laser beams using the deflector, or for writing or reading signals which are derived from a video signal source and with which the laser beams are intensity-modulated and deflected by the deflector to scan the medium and produce thereon a color image with the color dispersion compensated.

According to the present invention, a clock signal is used in signal processing to compensate for deflection. Color dispersion results from the detection of part of the actually-scanned laser beams of a multiplicity of wavelengths that have been deflected. Electronic adjustment of the processing circuitry is easy, and stable circuit operation is possible even without the use of rigorous temperature control. In addition, when the deflector or drive circuitry is subjected to the effects of external temperature variation causing a slight change in the range of the scanning laser-beam deflection angle, this has no influence on the image data of the object acquired during image input or on the image that is being output onto the media.

BRIEF DESCRIPTION OF THE DRAWINGS

The objects and features of the present invention will become more apparent from the following detailed description taken in conjunction with the accompanying drawings in which.

DETAILED DESCRIPTION OF THE PREFERRED EMBODIMENTS

The embodiments of the present invention will now be described with reference to FIGS. 1 and 2.

Figure 1:
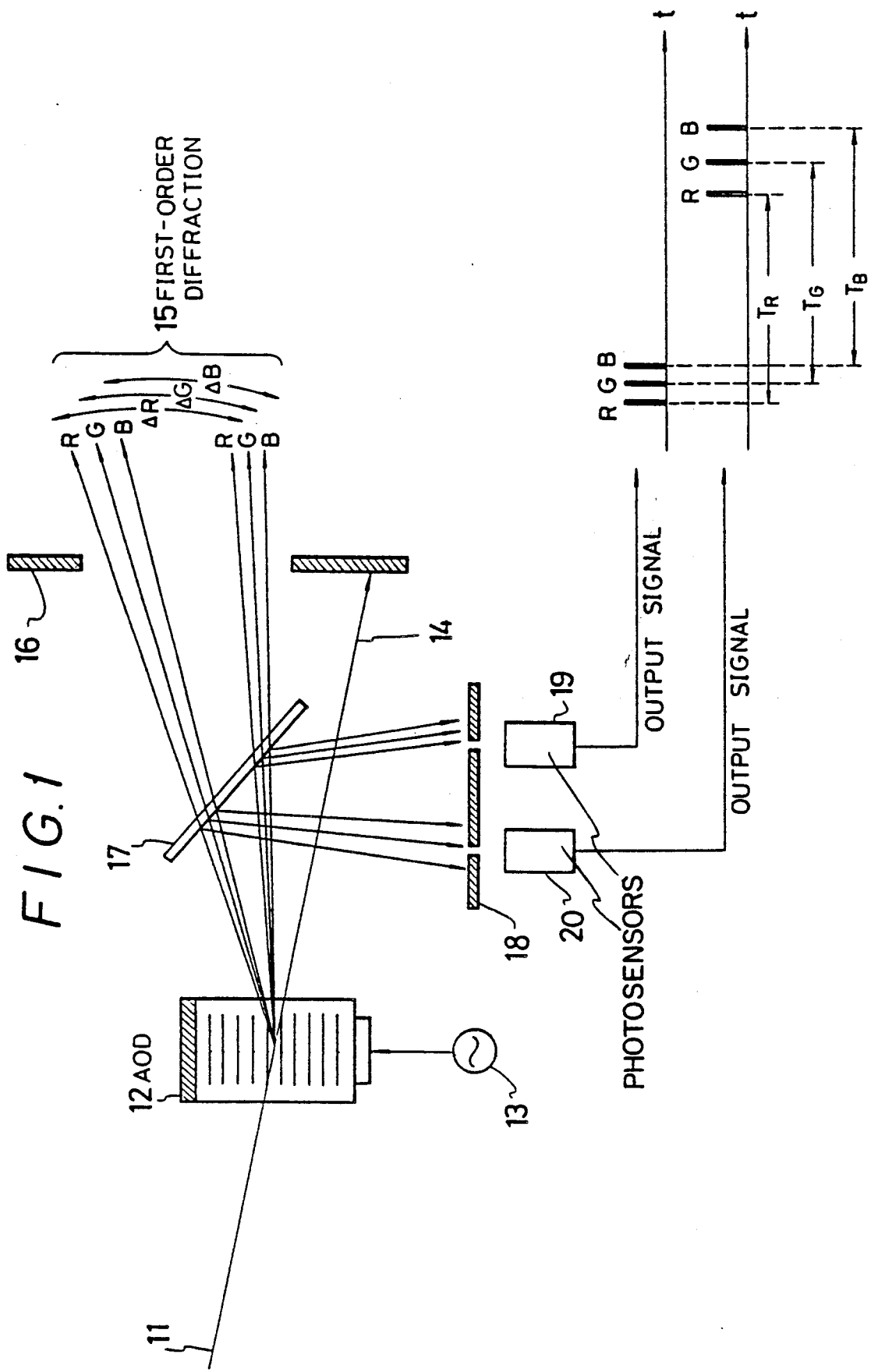
FIG. 1 is a block diagram showing the main portions of the optical system of the apparatus of the present invention.

FIG. 1 is a block diagram showing the main portions of the optical system of the apparatus of this invention.

Figure 3:
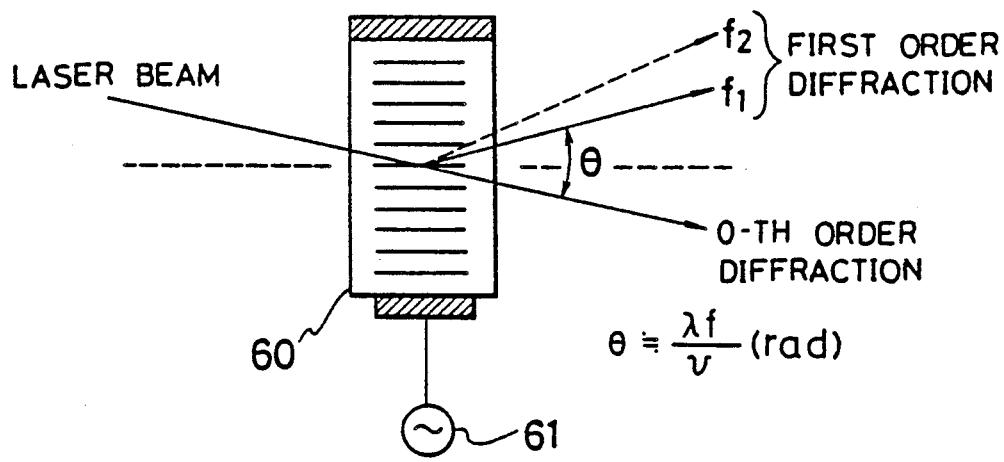
FIG. 3 is an explanatory diagram showing the operating principle of the acousto-optical deflector.
Figure 4:
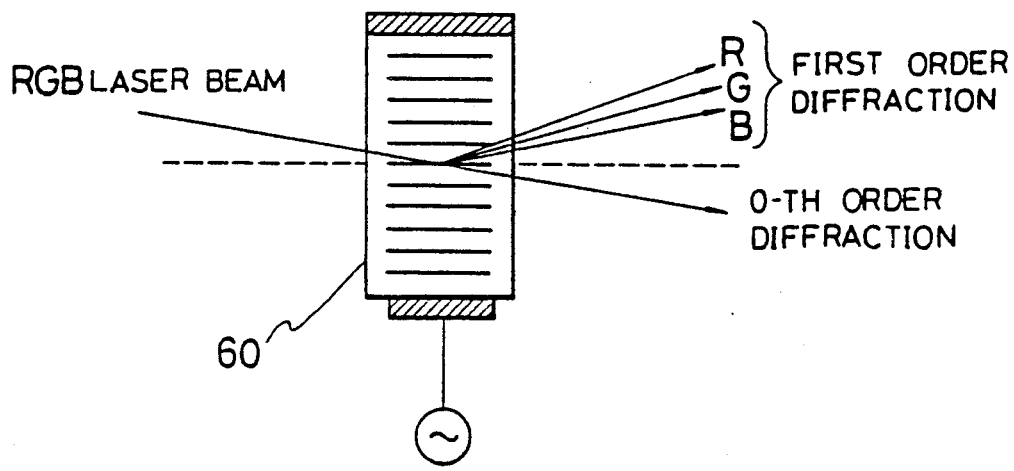
FIG. 4 is an explanatory diagram of the color dispersion produced by the acousto-optical deflector.

In FIG. 1, reference numeral 11 denotes a laser beam, composed of the three primary colors red (R), green (G) and blue (B), which impinges on an acousto-optical deflector (hereinafter referred to as "AOD") 12. The AOD 12 is driven by a signal source 13, and the laser beam is deflected by varying the ultrasonic drive frequency f thereof. The beam that passes through the AOD 12 is divided into straight zero-order light 14 and bent first-order, diffracted light 15. If the ultrasonic velocity in the AOD medium is v and the wavelength of the laser beam is $\lambda$, the deflection angle $\theta$ of the first-order light with respect to the zero-order light is $\theta = \lambda f / v$ and changes in accordance with changes in $\theta$. As $\theta$ depends on the light wavelength $\lambda$, use of laser light having different wavelengths R, G and B produces the kind of color dispersion shown in FIG. 1 (see FIGS. 3 and 4). When a laser beam of a different wavelength impinges on the AOD, the angle of incidence is wavelength-dependent and it is necessary to change the angle, little by little, for each wavelength. The angular difference is generally small, less than about 0.5°. For convenience, in FIG. 1, the incident laser beam 11 and the zero-order light 14 are depicted as a single beam of light.

The zero-order light 14 is blocked or interrupted by a slit 16 so that only first-order, diffracted light 15 is utilized for scanning. Part of the first-order diffracted light 14 is reflected by a beam-splitter 17, passes through a detection aperture 18, is detected by photosensors 19 and 20 constituted of photo-diodes or the like and undergoes photoelectric conversion The aperture 18 is located at a laser beam focal plane formed by steps of multiple lenses (not illustrated) positioned upstream and downstream of the AOD 12. As a result, the signal output by photosensors 19 and 20 form pulse trains corresponding to the light components of each wavelength. That is, as shown in FIG. 1, pulse signals are output from the two photosensors at a time difference that reflects the color-dispersed state of the laser light of each wavelength. The laser light beam deflection angles $\Delta R$, $\Delta G$ and $\Delta B$ corresponding to the R, G and B wavelengths become smaller, in that order, so that the time difference TR, TG and TB at which the light is picked up by means of photosensors 19 and 20 becomes larger, in that order, for a time difference that corresponds to the color dispersion of the laser beam.

Instead of being in the form of an opening the detection aperture 18 can be a small reflector that guides the reflected laser light to the photosensors 19 and 20.

Figure 2:
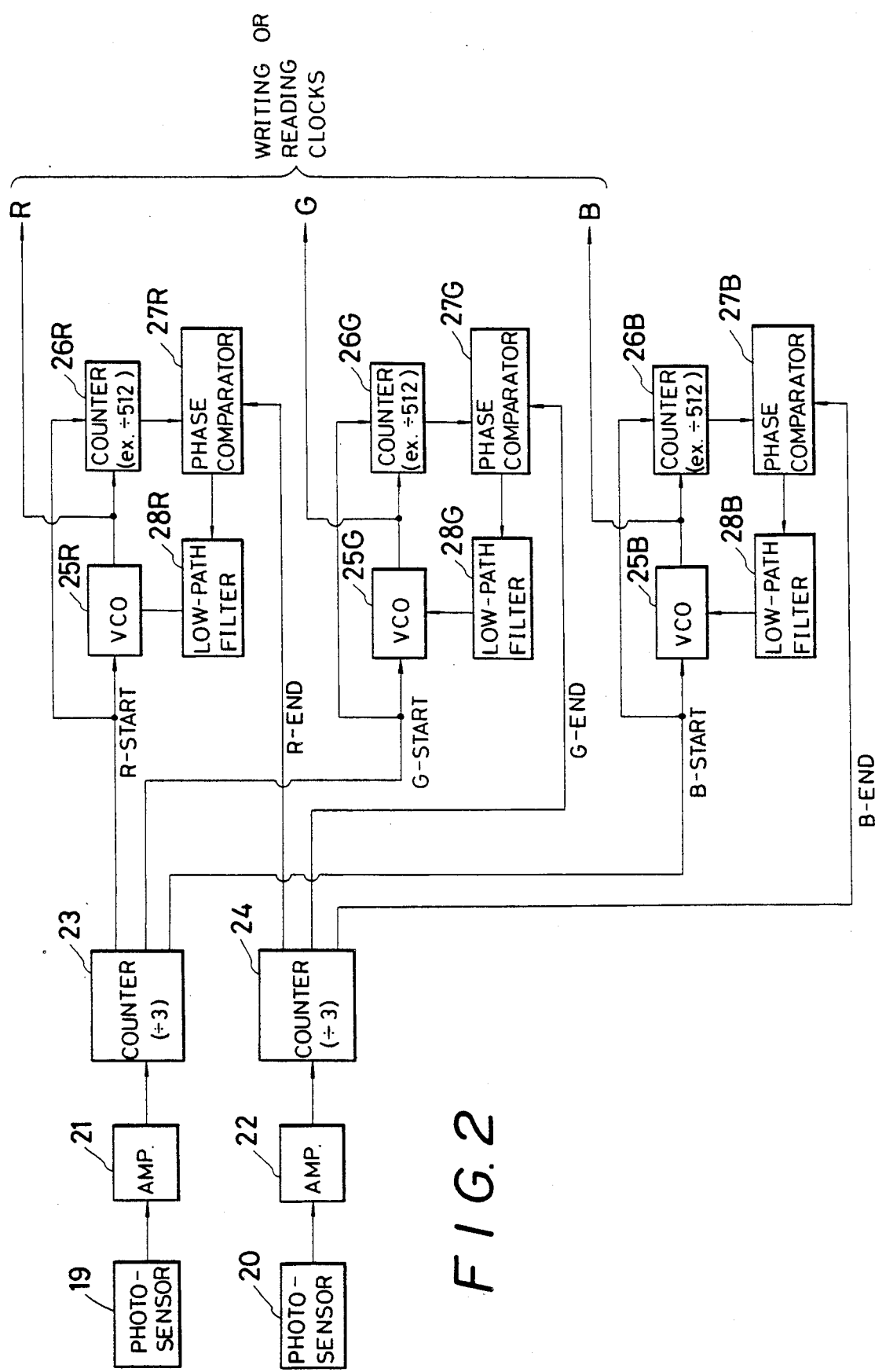
FIG. 2 is a block diagram showing the electrical construction of the apparatus shown in FIG. 1.

FIG. 2 show s an example of the electrical configuration of the main portions of the apparatus. With respect to FIG. 2, the signals output by photosensors 19 and 20 are amplified by corresponding amplifiers 21 and 22 to a level, such as, for example a TTL level, suitable for subsequent signal processing and are then input to counters 23 and 24. The counters 23 and 24 separate the pulse signals from the photosensors 19 and 20 into component signals corresponding to the wavelengths of the laser light beam. The component signals are then distributed to corresponding circuits. Downstream of this point, for each of the R, G and B components there is provided an identically-constructed circuit block. The circuit blocks are differentiated by the addition of R, G and B to the respective block number. In the following explanation, except when necessary, the blocks will be referred to simply by number.

The signal from the counter 23 marks the starting point of the AOD scanning of each of the laser beam wavelength components, and determines the initial oscillation phase of a voltage controlled oscillator (hereinafter referred to as "VCO") 25. A clock signal generated by the VCO 25 is applied to the counter 26 and the timing at which the counting starts is determined by the wavelength component signal obtained from photosensor 19 and separated by counter 23. The counters 26R, 26G and 26B are set to the same count for each wavelength, for example, to 512 bits or 1024 bits, and the signal output when the count is finished is input to a phase comparator 27. The phase comparator 27 compares the phase of the signal marking the end of the counting by the counter 26, and the phase of the signal of the wavelength components separated by the counter 24, and outputs a voltage corresponding to the phase difference. The signal from counter 24 marks the end point of the AOD-scanning of each of the wavelength components of the laser beam.

The voltage output by the phase comparator 27 is passed through a low-pass filter 28 to remove any unnecessary high-frequency components and noise, and is then applied to the frequency control terminal of the VCO 25. Thus, in accordance with the voltage output by the phase comparator 27, the oscillation of the VCOs 25 is synchronized so that the end-of-count timing by the counter 26 coincides with the time at which each of the wavelength components of the laser beam reaches the end point of scanning by the AOD. Therefore start of the clock signal oscillation generated by the VCOs 25R, 25G and 25B is governed by the pulse signal from the photosensor 19, and the ending of the clock signal is determined by the pulse signal from the photosensor 20. Additionally, the number of clock pulses in the interval between the beginning and termination is set so as to become the same for each wavelength component. As a result, for each of the wavelengths the time series of the clock signals produced by VCOs 25R, 25G and 25B, as shown above with respect to FIG. 5, can be used as control signals for compensating for the AOD-produced color dispersion. By using these signals as the clock for writing to and reading from memory, when laser beam scanning is used for image input/output, the effects of deflector-produced color dispersion can be effectively removed.

Figure 6:
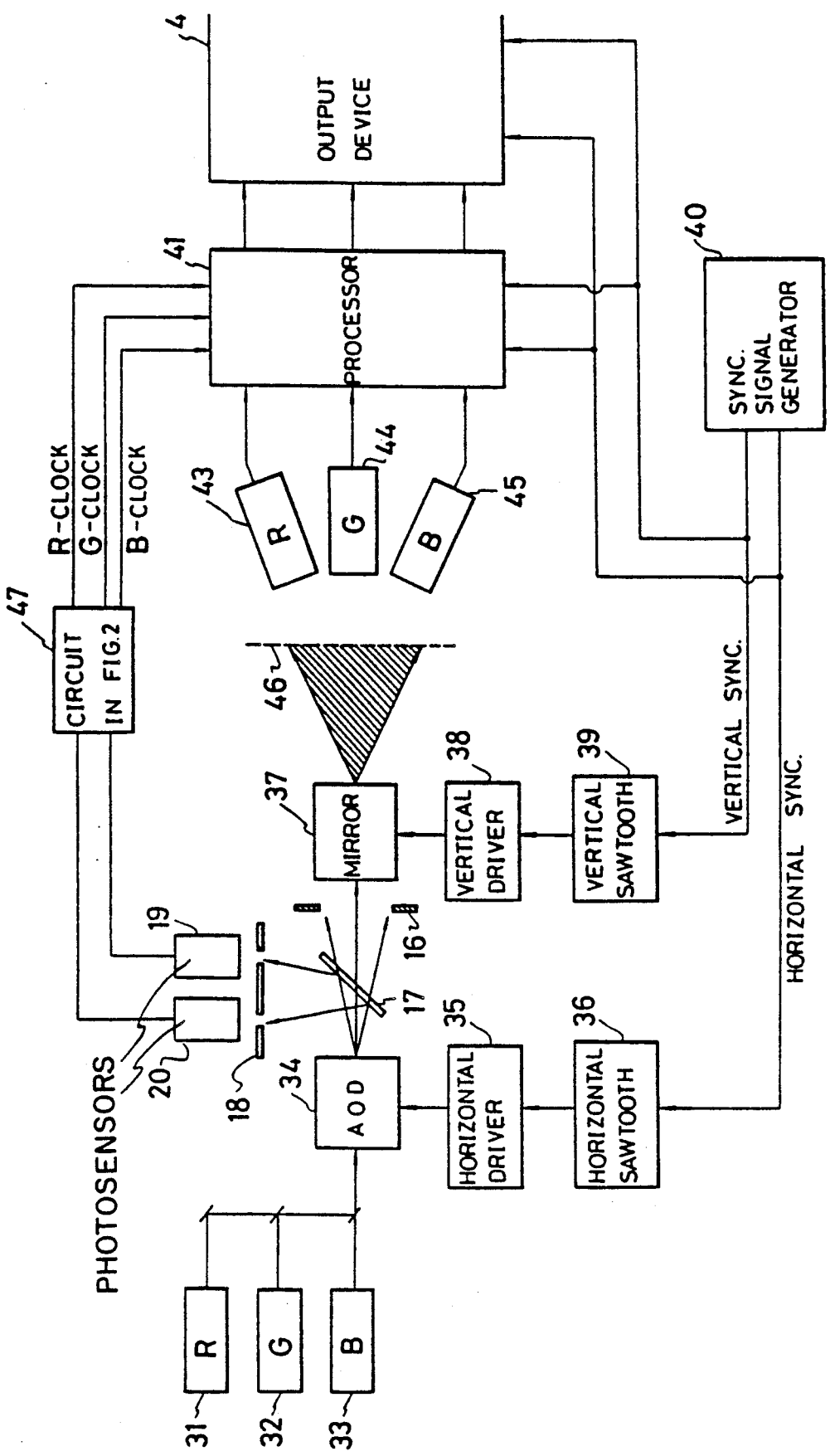
FIG. 6 is a block diagram of another embodiment of the laser beam scanning apparatus according to the present invention.

With reference to FIG. 6, as the light source, there are provided three laser light sources 31, 32 and 33 representing the three primary colors Red, Green and Blue (RGB) for obtaining color information of an object. The laser beams output by the laser light sources 31, 32 and 33 are deflected horizontally and vertically to effect two-dimensional scanning of the object. The frequencies of this deflection are, for example, 15.75 KHz horizontally and 60 Hz vertically. In the present embodiment an acousto-optical deflector 34 having the same construction as AOD 12 is used to provide the horizontal deflection. A mirror device 37 comprised of a swinging mirror, a polygonal mirror or the like is used for vertical deflection of the laser beams. The horizontal deflector 34 and the vertical deflector mirror device 37 are controlled by drivers 35 and 38, respectively, which are adapted to the respective drive systems thereof. Sawtooth waveform control signals are input to the drivers 35 and 38. The respective sawtooth waveform control signals are produced by generators 36 and 39. The generators 36 and 39 are operated in synchronization with horizontal synchronizing signals and vertical synchronizing signals generated by a synchronizing signal generator 40.

In accordance with the above structure, laser beams from the laser light sources 31, 32 and 33 scan the object 46 two-dimensionally and the Red, Green and Blue components of the laser beams that are reflected or transmitted therefrom are detected by, and input into, three corresponding photosensors 43, 44 and 45. Each of these photosensors consists of a photomultiplier, or a photoelectric converter such as a photodiode or the like and an RGB color filter.

As mentioned in the above, color dispersion is produced when an acousto-optical deflector is used to deflect the laser beams, and the video signals output by the photosensors 43, 44 and 45 are therefore affected thereby. In this embodiment, the color dispersion is corrected by a processor 41 provided in the photodetection system. The processor 41 consists of a video memory and a microprocessor device to control the video memory. The Red, Green and Blue color component data corrected by the processor 41 in terms of color dispersion are transmitted to an output device 42 such as a video monitor or a color recorder, or to another output device such as a video data processor.

When the object 46 is scanned using the horizontal deflection of FIG. 6, owing to the differences in the deflection angles of the R, G and B components, each of the R, G and B laser beams emitted at the same time reaches the object at a different position along the object scanning line. If the result of the detection and photoelectrical conversion by the photosensors 43, 44 and 45 was thus directly output, color dispersion would be produced in the output color image.

Accordingly, in this embodiment, the outputs of the photosensors 43, 44 and 45 are first stored in a memory provided in the processor 41, and color dispersion is eliminated by controlling the timing of the memory write and read operations. For inputting of the output of the photosensors 43 to 45 to the processor 41, a deflection timing may be used whereby the AOD drive frequency for the R, G and B components are $f_1$-$f_{2R}$, $f_{1G}$-$f_{2G}$ and $f_{1B}$-$F_2$, respectively. (See FIG. 5.) For this, using the configuration of FIG. 1, the R, G and B timing clocks are obtained based on a signal obtained from photosensors 19 and 20 by means of a circuit 47 corresponding to the configuration of FIG. 2, and are input to the processor 41.

By such a construction with respect to the video signals output by the photosensors 43, 44 and 45, data obtained at a specific time-base that differs with respect to each wavelength is written into memory, and read out using an identical time-base, thereby normalizing the output image data. In this embodiment, to store the photosensor outputs in memory, it is necessary to set a specific write period that has a different time-base for each of the R, G and B components within one horizontal scanning period, and at the read-out time, to apply an identical read-out timing in respect of each component. In the write-to-memory process, periods different from each other are set that have the waveforms R, G and B as shown in FIG. 5.

Figure 5:
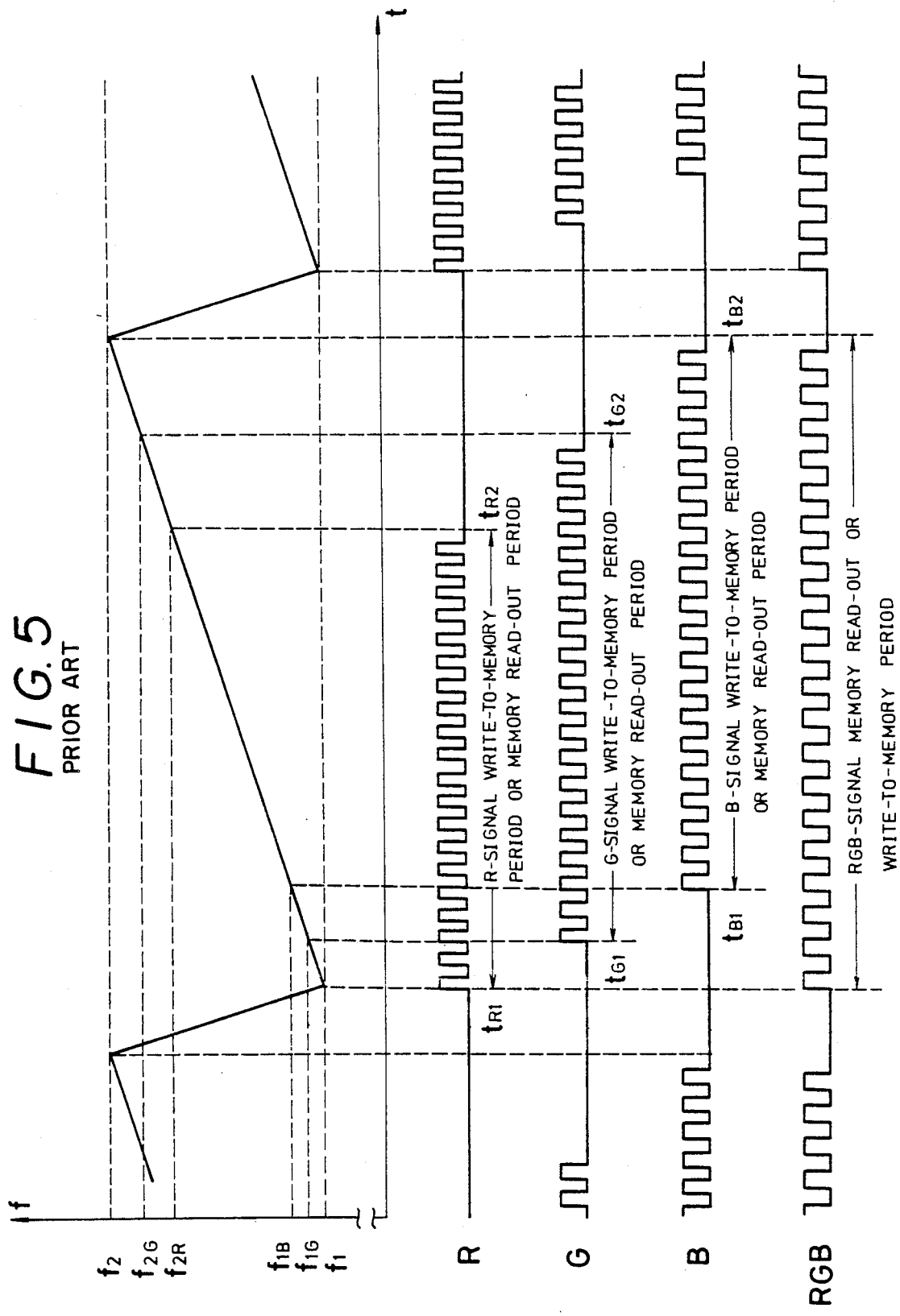
FIG. 5 is an explanatory view showing the color dispersion compensation principle, using memories.

That is, when the ultrasonic drive frequency of the acousto-optical deflector 34 is $f_1$, and the R component laser beam is beamed at a point on the object as in the case of the example shown in FIG. 5, the G and B component laser beams will be beamed at the same point as that of the R component when the ultrasonic drive frequencies are $f_{1G}$ and $f_{1B}$. Hence, the timings at which the R, G and B component video signals, taken from the photosensors 43, 44 and 45, start to be written to the memory are set to $t_{R1}$, $t_{G1}$ and $t_{B1}$, respectively. Also, the timing of the completion of the write-to-memory of the R, G and B components, using as the reference a frequency $f_2$ derived from the deflection angle of the B component, and considered similarly to the above, are set to $t_{R2}$, $t_{G2}$ and $t_{B2}$. Because the duration of the write period differs with each wavelength, it is necessary to use different values, corresponding to the frequency set by means of the above-mentioned VCO 25 in FIG. 2, for the write-to-memory speed for each of the R, G and B components. As for read-outs, as shown by the RGB waveform in FIG. 5, the R, G and B components are read out simultaneously.

Thus, at the completion of each single horizontal scan, each of the R, G and B component memories has stored therein horizontal scan data on the object, for each component. Again, as already stated in the foregoing, the write-to-memory timing and speed are controlled in accordance with the differences in the deflection angles among the R, G and B components so that the photosensor output signals having a different time-base for each component are utilized. That is, the number of the writing clock signals are controlled so as to be substantially the same for each color component during one scanning time period. By means of this write control, at the completion of the write operation the memories corresponding to each component will have stored therein, at an identical address, counting from the top address, the R, G and B data which represent the optical characteristics at the same location on the object.

Therefore, by afterwards performing a sequential read-out from the memory starting from the top address, color image data free of chromatic shift can be obtained. If required, this image data can be utilized by an output means 42 such as a video monitor or image processor, for example.

Figure 7:
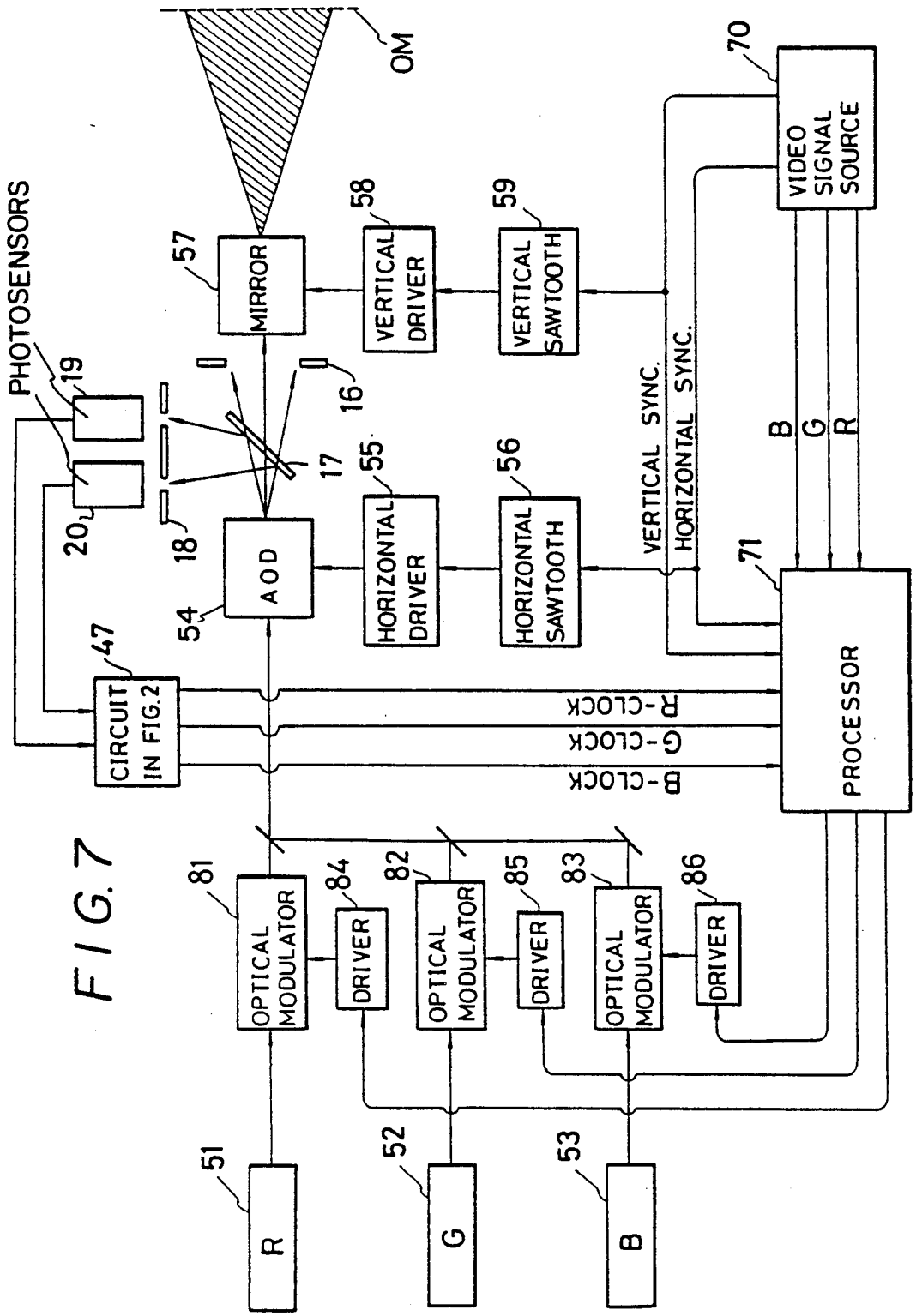
FIG. 7 is a block diagram of another embodiment of the apparatus of this invention.

In the embodiment shown in FIG. 7, to output the color images to the screen, film or other such output media OM, there are provided three laser light sources 51, 52 and 53 for the three primary colors Red (R), Green (G) and Blue (B). The R, G and B laser beams output by the laser light sources 51, 52 and 53 are each intensity-modulated by optical modulators 81, 82 and 83 on the basis of RGB video signal components output from a video signal source 70, and are then subjected to horizontal and vertical deflection and projected onto the medium OM. Similarly to the above example, the horizontal scanning frequency is 15.75 KHz and the vertical frequency is 60 Hz. An acousto-optical deflector 54 of the same construction as the AOD 12 of FIG. 1 is used to provide the deflection for the horizontal scanning. A mirror device 57 consisting of a swinging mirror, a polygonal mirror or the like is used for vertical deflection of the laser beam. The horizontal deflector 54 and the vertical deflector mirror device 57 are controlled by drivers 55 and 58, respectively, which are adapted to the respective drive systems thereof. Sawtooth waveform control signals are input to the drivers 55 and 58. The respective sawtooth waveform control signals are produced by generators 56 and 59. The operation of the generators 56 and 59 is synchronized with the horizontal synchronizing signals and vertical synchronizing signals generated by the video signal source 70.

As mentioned in the above, color dispersion is produced when an acousto-optical deflector is used for the optical deflection. If the above construction was used to perform deflection of the laser beam without correction, with respect to horizontal deflection performed using the acousto-optical deflector 54, the effect of the color dispersion will be that the identically timed R, G and B laser beam components would reach the output medium OM at different points. This positional difference would be observed as chromatic shift.

In this embodiment, the color dispersion is corrected by the time-base adjustment of the corresponding modulating operation of the optical modulators 81, 82 and 83. The optical modulators 81, 82 and 83 are controlled by a processor 71 via respective drivers 84, 85 and 86.

The processor 71 drives the modulator drivers 84, 85 and 86 on the basis of an RGB video signal output by video signal source 70 (which may be a video camera, a telecine device or a VTR or the like) and is comprised of memory devices and a microprocessor device for the I/0 control thereof.

To compensate for the said color dispersion, with this horizontal deflection using the AOD 54, the R, G and B intensity components of each picture element in the signal source must reach the output medium OM at the same point, there may be utilized timing to equalize the deflection angle for each wavelength. For this, using the configuration of FIG. 1, the R, G and B timing clocks are obtained based on a signal from photosensors 19 and 20 by means of a circuit 4 7 corresponding to the configuration of FIG. 2, and are input to processor 71.

That is, the R laser beam is modulated according to an R component intensity of a particular picture element of the video signal from the signal source, for example, when the ultrasonic frequency is $f_1$. As further seen from the example of FIG. 5, the G and B laser beams are modulated by the G component intensity and B component intensity of the same picture element, when the frequencies become $f_{1G}$ and $f_{1B}$, respectively. Accordingly, it becomes possible for the correct R, G and B intensity components of the desired picture element contained in the video signal to be optically reproduced on the same spot on the output medium Similarly, with respect to the upper limit frequency $f_2$, the G and R components are intensity-modulated using the B component as the reference, when the frequencies are $f_{2G}$ and $f_{2R}$, respectively. Thus, it becomes possible for the correct R, G and B intensity components of the desired picture element contained in the video signal to be optically reproduced on the same spot on the output medium. Accordingly, in this embodiment, the RGB video signal output by the video signal source 70 is first stored in a memory provided in the processor 71 as the intensity data of the R, G and B component, and the R, G and B intensity data are then read out at a timing that provides the same deflection angle with respect to the R, G and B laser components for each picture element of the video signal from the signal source.

For each of the R, G and B laser beam components, input data from the video signal source is written to memory at the same time, as it is, within one horizontal scanning period. As for the read-out operation, with reference to the R, G and B waveforms of FIG. 5, the data written in during the preceding scanning period, as shown in RGB is read out for each individual wavelength. The timing of the start of the read-out of the RGB intensity data, from the above conditions, is set at $t_{R1}$, $t_{G1}$ and $t_{B1}$ when the respective frequencies are $f_1$, $f_{1G}$ and $f_{1B}$. Similarly, completion of the read-out is set at $t_{R2}$, $t_{G2}$ and $t_{B2}$ when the frequencies are $f_{2R}$, $f_{2G}$ and $f_2$. Because the duration of the read-out period differs, a different memory read-out speed must be used for each of the R, G and B components. In other words, the number of the reading-out clock signals are controlled so as to be substantially the same for each laser beam, that is, for each color component during the scanning time period.

As described in the foregoing, by regulating the timing of data input to the modulation means, the R, G and B laser beams correctly modulated according to the R, G and B intensity components of the desired picture element of the video signal from the signal source can be beamed at the same spot on the output medium. Viewed microscopically, the R, G and B intensity components of a particular picture element from the signal source are not optically reproduced at the output medium at exactly the same time. This time difference, however, provides no problem whatsoever, because it is very small, when viewed with the naked eye, and when a screen or photosensitive film is used as the medium on which the image is reproduced.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention should not be limited to the particular embodiment disclosed as the best mode contemplated for carrying out the invention, but that the invention will include all embodiments falling within the scope of the appended claims.

What is claimed is:

1. A laser beam scanning apparatus adapted for use in deflecting a laser beam to scan an object or medium in at least one direction, comprising:
   a laser source for producing a plurality of laser beams each having a different wavelength;
   a signal source for producing a drive signal having a frequency which can be changed during one scanning time period of the laser beam;
   an acousto-optical deflector responsive to the drive signal for deflecting the laser beams simultaneously at an angle of scanning deflection which is dependent on the drive signal frequency and the wavelength of each laser beam, causing color dispersion in the laser beam deflected by the deflector;
   detecting means disposed at a plane corresponding to a focal plane on which the laser beams are focussed;
   a pair of photosensors each sensitive to all of the plurality of the laser beam wavelengths transmitted through or reflected on said detecting means and responsive thereto to produce start and end signals during said one scanning time period, respectively;
   means for generating a plurality of clock signal trains each of which corresponds to one of the plurality of laser beam wavelengths and each of which begins and ends in response to the start and end signals; and
   means for adjusting the number of the clock signals in the clock signal trains to be substantially the same for each laser beam during the scanning period.

2. A laser beam scanning apparatus as set forth in claim 1; wherein said clock signals are used as those for writing or reading signals which are derived from a plurality of photoconductors as the object or medium is scanned by the laser beams using said deflector.

3. A laser beam scanning apparatus as set forth in claim 1; wherein said clock signals are used as those for writing or reading signals which are derived from a video signal source and with which the laser beams are intensity-modulated and deflected by said deflector to scan the object or medium and produce thereon a color image.

4. A laser beam scanning apparatus adapted for use in deflecting a laser beam to scan an object in at least one direction to produce a video signal corresponding to the object comprising:
   a laser source for producing a plurality of laser beams each having a different wavelength;
   a signal source for producing a drive signal having a frequency which can be changed during one scanning time period of the laser beam;
   an acousto-optical deflector responsive to the drive signal for deflecting the laser beams simultaneously at an angle of scanning deflection which is dependent on the drive signal frequency and the wavelength of each laser beam, causing color dispersion in the laser beam deflected by the deflector;
   a plurality of first photosensors each sensitive to corresponding ones of the plurality of laser beam wavelengths for photoelectrically converting the laser beam into a video signal of the object corresponding to one of the laser beams of a predetermined wavelength;
   a pair of second photosensors each sensitive to all of the plurality of laser beam wavelengths to produce start and end signals during said one scanning time period, respectively;
   means for generating a plurality of clock signal trains each of which corresponds to one of the plurality of laser beam wavelengths in response to the start and end signals from the second photosensors; and
   a signal processor for processing the video signals derived from the first photosensors using the clock signals derived from the second photosensors in such a manner that the video signals are processed differently in terms of scanning time from the others and output at the same timing, so that all the video signals are color-corrected to compensate for the color dispersion.

5. A laser beam scanning apparatus adapted for use in deflecting a laser beam to scan a medium in at least one direction to produce a color image thereon, comprising:
   a laser source for producing a plurality of laser beams each having a different wavelength;
   a video signal source for producing color video signals the color of which corresponds to one of the plurality of laser beam wavelengths;
   a plurality of intensity modulators each connected to receive one of the laser beams and one of the color video signals for intensity-modulating corresponding ones of the laser beams with corresponding ones of said video signals;
   a signal source for producing a drive signal having a frequency which can be changed during one scanning time period of the laser beam;
   an acousto-optical deflector responsive to the drive signal for deflecting the laser beams simultaneously at an angle of scanning deflection which is dependent on the drive signal frequency and the wavelength of each laser beam, causing color dispersion in the laser beam deflected by the deflector;

a pair of photosensors each sensitive to all of the plurality of laser beam wavelengths to produce start and end signals during said one scanning time period, respectively;

means for generating a plurality of clock signal trains each of which corresponds to one of the plurality of laser beam wavelengths in response to the start and end signals from the photosensors; and a signal processor for adjusting the intensity modulation using the clock signals derived from the photosensors in such a manner that each of the laser beams is intensity-modulated differently in terms of scanning time from the others to obtain substantially the same angle of the acousto-optical deflector for all the color laser beams.

6. An apparatus for correcting the effects of color dispersion of an RGB signal comprising:

a laser source for producing laser light comprised of a plurality of laser beams each having a different wavelength;

diffracting means, having diffraction characteristics determined by a plurality of drive frequencies, for diffracting the laser light causing the laser light to disperse into the plurality of laser beams, the extent of diffraction being determined by the wavelength of each laser beam and the drive frequency;

photosensing means for detecting each diffracted laser beam and photoelectrically converting each diffracted laser beam into an electrical signal, the conversion occurring at a first drive frequency and, after a period time, at a second drive frequency; and diffraction compensating means receptive of the electrical signal for outputting a wavelength timing signal containing timing information relating to the extent of diffraction of each diffracted laser beam during the time between the first and second drive frequencies.

7. An apparatus according to claim 6; wherein the diffracting means comprises an acousto-optical deflector for deflecting the laser light.

8. An apparatus according to claim 7; wherein the diffracting means further comprises a signal source for outputting the plurality of drive frequencies to the acousto-optical deflector.

9. An apparatus according to claim 6 further comprising directing means for directing each laser beam to the photosensing means.

10. An apparatus according to claim 9; wherein the directing means comprises a beam splitter.

11. An apparatus according to claim 6; wherein the photosensing means comprises photodiodes.

12. An apparatus according to claim 11; wherein the number of photodiodes equals two.

13. An apparatus according to claim 6; wherein the laser source produces laser beams that comprise red, green and blue wavelengths of light.

14. An apparatus for removing the effects of color dispersion from an RGB signal comprising:

a laser light source for producing laser light having a plurality of laser beams each having a different wavelength;

diffracting means, having diffraction characteristics determined by a plurality of drive frequencies, for diffracting the laser light to cause the laser light to disperse into the plurality of laser beams, the extent of diffraction being determined by the wavelength of each laser beam and the drive frequency, and for separating each diffracted laser beam into a first and second dispersed portion;

first photosensing means disposed to receive the first portion of each diffracted and dispersed laser beam for photoelectrically converting the first portion of each laser beam when the diffracting means is driven at a first frequency and, after a period of time, at a second frequency, into a wavelength timing signal containing timing information relating to the extent of diffraction, and for outputting each wavelength timing signal during the time between the first and second drive frequencies;

second photosensing means disposed to receive the second portion of each diffracted and dispersed laser beam for photoelectrically converting the second portion of each laser beam into an electrical signal and for outputting each electrical signal; and processing means receptive of each wavelength timing signal for storing each electrical signal, the storage speed of each electrical signal being determined by each wavelength timing signal, and for sequentially outputting each electrical signal whereby the storage and outputting of each electrical signal removes the effects of dispersion.

15. An apparatus according to claim 14; wherein the laser source produces a plurality of laser beams having red, green and blue wavelengths of light.

16. An apparatus according to claim 14; wherein the diffracting means comprises an acousto-optical deflector for deflecting the laser light.

17. An apparatus according to claim 16; wherein the acousto-optical deflector is driven at a frequency of 15.75 Khz.

18. An apparatus according to claim 14; wherein the second photosensing means comprises photomultipliers.

19. An apparatus according to claim 18; wherein the number of photomultipliers equals three.

20. An apparatus according to claim 14; wherein the processing means comprises video storing means for storing each electrical signal and microprocessor means for processing each wavelength timing signal and electrical signal.

21. An apparatus according to claim 14; wherein the apparatus further comprises an output device for displaying a visual representation of each dispersion-free electrical signal.

22. An apparatus for correcting the effects of color dispersion on a video signal comprising:

a video information source for outputting video information representative of a plurality of wavelengths of light and for outputting a plurality of drive frequencies;

a plurality of laser light sources each outputting a laser beam having a different wavelength;

transmitting means receptive of the video information and each laser beam for transmitting a video signal comprised of the video information and each laser beam;

diffracting means, having diffraction characteristics determined by the plurality of drive frequencies, for diffracting the video signal to cause the video signal to disperse into a plurality of video signals each having a different wavelength, the extent of diffraction being determined by the wavelength of each video signal and the drive frequency;

separating means disposed to receive the diffracted video signals for separating each diffracted video signal into a first portion and a second portion;

diffraction angle compensating means disposed to receive the first portion of each diffracted and dispersed video signal and for outputting a timing signal for the first portion of each video signal; and
diffraction correcting means receptive of each timing signal and video information for correcting the effects of dispersion on the video signal whereby the diffraction correcting means drives the transmitting means with the video information upon receiving each timing signal thereby correcting the effect of color dispersion on the video signal.

23. An apparatus according to claim 22; wherein the apparatus further comprises an output medium for displaying the dispersion-free video signal.

24. An apparatus according to claim 22; wherein the transmitting means comprises optical modulators for modulating the video information with each laser beam.

* * * * *